United States Patent
Yang

(10) Patent No.: US 12,382,372 B2
(45) Date of Patent: Aug. 5, 2025

(54) METHOD AND DEVICE FOR REPORTING RESOURCE SENSING RESULT, USER EQUIPMENT, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 744 days.

(21) Appl. No.: 17/274,483

(22) PCT Filed: Sep. 21, 2018

(86) PCT No.: PCT/CN2018/107105
§ 371 (c)(1),
(2) Date: Mar. 9, 2021

(87) PCT Pub. No.: WO2020/056765
PCT Pub. Date: Mar. 26, 2020

(65) Prior Publication Data
US 2021/0274432 A1    Sep. 2, 2021

(51) Int. Cl.
*H04W 48/14*    (2009.01)
*H04W 4/40*    (2018.01)
(Continued)

(52) U.S. Cl.
CPC ............ *H04W 48/14* (2013.01); *H04W 4/50* (2018.02); *H04W 24/02* (2013.01); *H04W 24/10* (2013.01);
(Continued)

(58) Field of Classification Search
CPC ....... H04W 48/14; H04W 4/50; H04W 24/02; H04W 24/10; H04W 48/16; H04W 4/40; H04W 8/22; H04W 24/08; H04L 5/0057
See application file for complete search history.

(56) References Cited

U.S. PATENT DOCUMENTS 10,375,595 B2 *    8/2019    Zhang ................. H04W 16/14
10,623,978 B2 *    4/2020    Sadeghi ............ H04W 72/0446
(Continued)

FOREIGN PATENT DOCUMENTS

CN    103067926 A    4/2013
CN    105636217 A    6/2016
(Continued)

OTHER PUBLICATIONS

International Search Report and Written Opinion issued on May 29, 2019 in PCT/CN2018/107105 filed on Sep. 21, 2018, 6 pages.
(Continued)

*Primary Examiner* — Ivan O Latorre
(74) *Attorney, Agent, or Firm* — Oblon, McClelland, Maier & Neustadt, L.L.P.

(57) ABSTRACT

Provided is a method for reporting a resource sensing result that can include determining whether a traffic is currently in progress in response to detecting that a resource sensing result needs to be reported to a base station, and adding a specified identifier to a resource sensing message in response to determining that no traffic is currently in progress. The specified identifier being intended to indicate that no traffic is currently in progress. The method can further include reporting the resource sensing message to the base station.

15 Claims, 4 Drawing Sheets

(51) Int. Cl.
  *H04W 4/50* (2018.01)
  *H04W 8/22* (2009.01)
  *H04W 24/02* (2009.01)
  *H04W 24/08* (2009.01)
  *H04W 24/10* (2009.01)
  *H04W 48/16* (2009.01)

(52) U.S. Cl.
  CPC .............. *H04W 48/16* (2013.01); *H04W 4/40* (2018.02); *H04W 8/22* (2013.01); *H04W 24/08* (2013.01)

(56) References Cited

U.S. PATENT DOCUMENTS

| | | | |
|---|---|---|---|
| 2017/0325229 A1 | 11/2017 | Gao et al. | |
| 2018/0070400 A1* | 3/2018 | Wu | H04W 4/06 |
| 2019/0387377 A1* | 12/2019 | Zhang | H04W 52/383 |
| 2021/0007101 A1* | 1/2021 | Tooher | H04W 72/0446 |

FOREIGN PATENT DOCUMENTS

| | | |
|---|---|---|
| CN | 106792786 A | 5/2017 |
| CN | 107645774 A | 1/2018 |
| CN | 108156629 A | 6/2018 |
| CN | 108541017 A | 9/2018 |
| WO | WO 2016/072782 A1 | 5/2016 |
| WO | WO 2018/099237 A1 | 6/2018 |

OTHER PUBLICATIONS

Combined Chinese First Office Action and Search Report issued on Jan. 18, 2021 in Chinese Patent Application No. 201880001448.1, 8 pages.

* cited by examiner

METHOD AND DEVICE FOR REPORTING RESOURCE SENSING RESULT, USER EQUIPMENT, AND STORAGE MEDIUM

CROSS-REFERENCE TO RELATED APPLICATIONS

This application is a national phase application based on PCT/CN2018/107105, filed on Sep. 21, 2018, the entire content of which is incorporated herein by reference.

BACKGROUND OF THE INVENTION

Field of the Invention

The present disclosure relates to the field of wireless communication technologies, including to a method and a device for reporting a resource sensing result, user equipment (UE), and a storage medium.

Description of the Related Art

There are two resource allocation schemes on a sidelink in vehicle to everything (V2X), which is a wireless communication technology for vehicles. In one scheme, a base station dynamically schedules resources for UE. In the other scheme, UE autonomously selects resources from a resource pool. In a new radio (NR) standard, it is allowed that resource pools of two scheduling schemes are overlapped, which may cause a collision between dynamically scheduled resources and resources autonomously selected by UE.

SUMMARY OF THE INVENTION

Aspects of the disclosure provide a method and a device for reporting a resource sensing result, a UE, and a storage medium. As an improved method for reporting a resource sensing result to a base station by UE is introduced, the resource sensing result may assist a base station in resource scheduling, so as to avoid collisions.

According to a first aspect of the disclosure, a method for reporting a resource sensing result is provided. The method can include determining whether a service is currently in progress in response to detecting that a resource sensing result needs to be reported to a base station. The method can further include adding a specified identifier to a resource sensing message in response to determining that no service is currently in progress, wherein the specified identifier is intended to indicate that no service is currently in progress, and reporting the resource sensing message to the base station.

According to a second aspect of the disclosure, a device for reporting a resource sensing result is provided. The device can include a processor and a memory that is configured to store instructions executable by the processor. The processor, when executing the executions, is caused to perform a method for reporting a resource sensing result comprising determining whether a service is currently in progress in response to detecting that a resource sensing result needs to be reported to a base station. Further, the method can include adding a specified identifier to a resource sensing message in response to determining that no service is currently in progress, where the specified identifier is intended to indicate that no service is currently in progress, and reporting the resource sensing message to the base station.

According to a third aspect of the disclosure, a UE is provided. The UE can include processor and a memory that is configured to store instructions executable by the processor. The processor, when executing the executions, is caused to perform a method for reporting a resource sensing result including determining whether a service is currently in progress in response to detecting that a resource sensing result needs to be reported to a base station, adding a specified identifier to a resource sensing message in response to determining that no service is currently in progress, where the specified identifier is intended to indicate that no service is currently in progress, and reporting the resource sensing message to the base station.

According to a fourth aspect of the disclosure, a non-transitory computer-readable storage medium storing instructions therein is provided. The instructions, when executed by a processor, cause the processor to perform the method for reporting a resource sensing result in the first aspect of the embodiments of the present disclosure.

It should be understood that the foregoing general description and the following detailed description are only exemplary and explanatory, and cannot limit the present disclosure.

BRIEF DESCRIPTION OF THE DRAWINGS

The accompanying drawings, which are incorporated in and constitute a part of the description, illustrate exemplary embodiments consistent with the present disclosure and, together with the description, serve to explain the principles of the present disclosure.

DETAILED DESCRIPTION OF THE PREFERRED EMBODIMENTS

Figure 1:
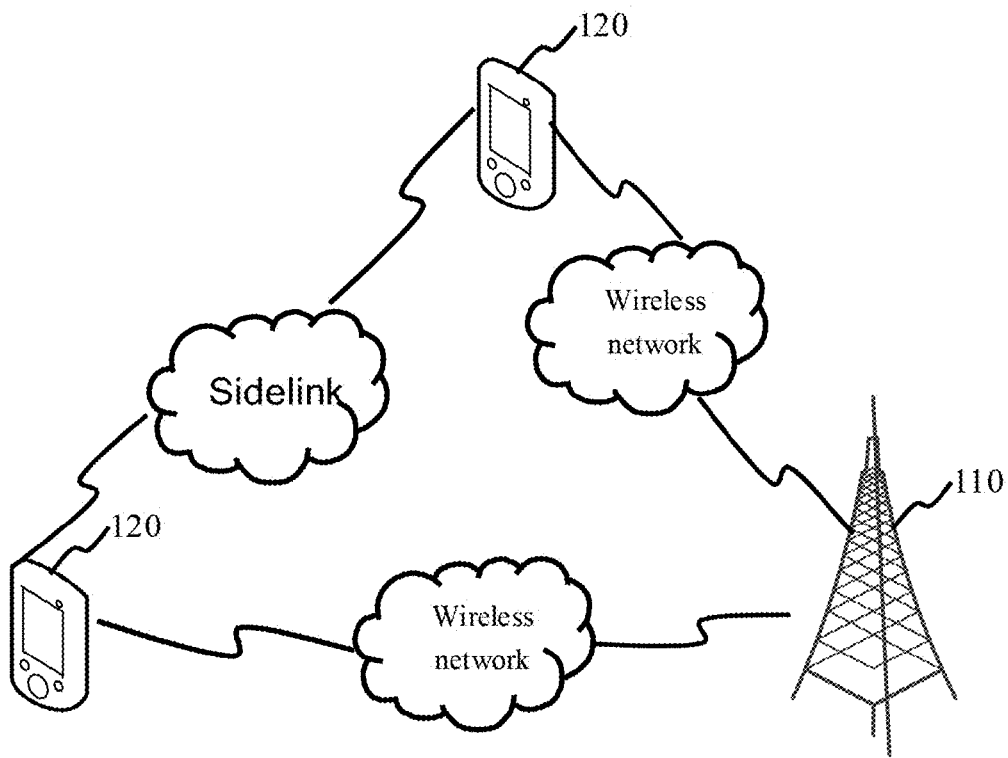
FIG. 1 is a diagram of a system architecture for reporting a resource sensing result according to an exemplary embodiment.

To make the objectives, technical solutions, and advantages of the present disclosure clearer, the implementations of the present disclosure are further described below in detail with reference to the accompanying drawings.

Exemplary embodiments are described in detail herein, and examples thereof are embodied in the accompanying drawings. Where the description hereinafter relates to the accompanying drawings, unless otherwise specified, identical reference numerals in the accompanying drawings denote identical or like elements. Implementation manners described in the following exemplary embodiments do not necessarily represent all the implementation manners consistent with the present disclosure. On the contrary, these implementation manners are merely examples illustrating apparatuses and methods according to some aspects of the present disclosure, as described in the appended claims.

At present, UE performs resource sensing only when a service needs to be executed. Therefore, when periodic reporting is triggered and a service is currently in progress, the UE determines a start time and an end time of the current service as a sensing start time and a sensing end time respectively, determines a resource sensing result based on the sensing start time and the sensing end time, and reports a resource sensing message to a base station, the resource sensing message carries the resource sensing result.

The UE cannot report a resource sensing message to the base station and as a result the base station incorrectly determines a current state of the UE when no service is currently in progress at a current moment and it is detected that a resource sensing result needs to be reported to a base station.

FIG. 1 is a schematic diagram of a system architecture related to a method for reporting a resource sensing result according to some exemplary embodiments of the present disclosure. The system architecture includes a base station 110 and a plurality of UEs 120. The plurality of UEs 120 are connected by a sidelink, and the base station 110 is connected to the plurality of UEs 120 by a wireless network. The UE 120 is a handheld device (for example, a mobile phone) having a wireless communication function, an in-vehicle device (the in-vehicle device may be a device in any vehicle, for example, the in-vehicle device is a device in a car, a device in a train, a device in a ship), a wearable device, a computing device or another processing device connected to a wireless modem, or the like. In the embodiments of the present disclosure, the UE 120 is not specifically limited.

When communicating between the UEs 120, data can be transmitted in a sidelink transmission mode. When the data are transmitted between UEs 120 in the sidelink transmission mode, the base station 110 needs to allocate resources carrying data to the UE 120. The base station 110 allocates resources to the UE 120 in two schedules. In one schedule, the base station 110 dynamically schedules resources for the UE 120. In the other schedule, the UE 120 autonomously selects resources from a resource pool. In a new radio (NR) standard, it is allowed that resource pools of two scheduling schemes are overlapped, which may cause a collision between dynamically scheduled resources and resources autonomously selected by the UE 120. Therefore, an improved method for reporting a resource sensing result to the base station 110 by the UE 120 is introduced, and the resource sensing result may assist the base station 110 in resource scheduling, so as to avoid collisions.

The way by which the UE 120 performs resource sensing may be as follows: The UE 120 senses transmission energy on each resource block on the sidelink within a previous period of time, then computes, based on a transmission period, whether another UE 120 will transmit data on a certain resource block, that is, whether the resource block will be occupied, to obtain a resource sensing result.

When it is detected that the resource sensing result needs to be reported to a base station 110, the UE 120 determines whether a service is currently in progress. When no service is currently in progress, the UE 120 adds a specified identifier to a resource sensing message, where the specified identifier is intended to indicate that no service is currently in progress. The UE 120 reports the resource sensing message to the base station 110.

The resource sensing message includes a specified identifier, where the specified identifier is intended to indicate that no service is currently in progress. The specified identifier is a first identifier, and the first identifier is intended to indicate that a resource sensing result cannot be determined currently. The resource sensing message further includes a first resource sensing result and a specified identifier, where the specified identifier is a second identifier. The first resource sensing result is a resource sensing result obtained before a current moment. The second identifier is intended to indicate that the first resource sensing result is the resource sensing result obtained before the current moment. The resource sensing message further includes a second resource sensing result and a specified identifier, where the specified identifier is a third identifier. The second resource sensing result is a resource sensing result determined based on a preset sensing start time and a preset sensing end time. The third identifier is intended to indicate that the second resource sensing result is the resource sensing result determined based on the preset sensing start time and the preset sensing end time.

Figure 2:
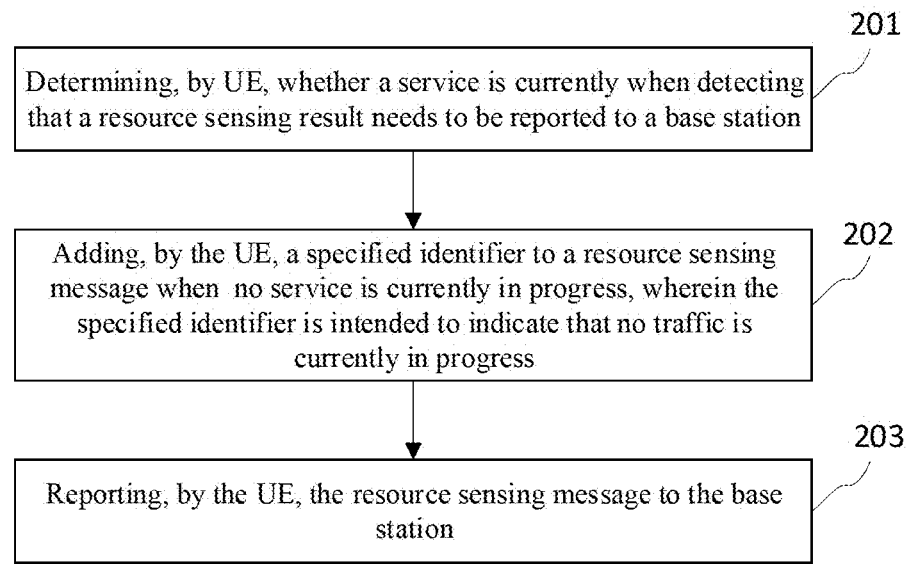
FIG. 2 is a flowchart of a method for reporting a resource sensing result according to an exemplary embodiment.

FIG. 2 is a flowchart of a method for reporting a resource sensing result according to an exemplary embodiment. As shown in FIG. 2, the method for reporting a resource sensing result includes the following steps.

In step 201, UE determines whether a service is currently in progress in response to detecting that a resource sensing result needs to be reported to a base station.

In step 202, the UE adds a specified identifier to a resource sensing message in response to determining that no service is currently in progress, where the specified identifier is intended to indicate that no service is currently in progress; and In step 203, the UE reports the resource sensing message to the base station.

In a possible implementation, the specified identifier is a first identifier, and the first identifier is intended to indicate that the resource sensing result is not able to be determined currently.

In a possible implementation, before reporting the resource sensing message to the base station, the method can further include adding a first resource sensing result to the resource sensing message, where the first resource sensing result is a resource sensing result acquired before a current moment, and correspondingly, the specified identifier is a second identifier intended to indicate that the resource sensing result is acquired before the current moment.

In a possible implementation, the second identifier is a time difference between the current moment and a sensing moment of the first resource sensing result.

In a possible implementation, before reporting the resource sensing message to the base station, the method can further include acquiring a preset sensing start time and a preset sensing end time, determining a second resource sensing result at a current moment based on the preset sensing start time and the preset sensing end time, and adding the second resource sensing result to the resource sensing message.

In a possible implementation, the specified identifier is a third identifier, and the third identifier is intended to indicate that the second resource sensing result is determined based on the preset sensing start time and preset sensing end time.

In a possible implementation, acquiring the preset sensing start time and the preset sensing end time includes receiving a reconfiguration message from the base station, where the reconfiguration message includes the preset sensing start time and the preset sensing end time, or determine the preset sensing start time and preset sensing end time based on the current moment and a preset time interval.

In a possible implementation, when a reporting mechanism is to periodically report the resource sensing result and the current moment is a reporting moment in a current period, it is determined that it is detected that the resource sensing result needs to be reported, or, when a reporting mechanism is to non-periodically report the resource sensing result and a reporting instruction from the base station is received, it is determined that it is detected that the resource sensing result needs to be reported.

In a possible implementation, the method can include determining an actual sensing start time and an actual sensing end time based on a start time and an end time of the current service if the service is currently in progress, determining a third resource sensing result based on the actual sensing start time and the actual sensing end time, and adding a third sensing result to the resource sensing message.

According to the embodiments of the present disclosure, a specific identifier is added to a resource sensing message, such that UE can report the resource sensing message when the UE detects that a resource sensing result needs to be transmitted to a base station and no service is currently in progress at a current moment, which enables the base station to receive the resource sensing result reported by the UE, thereby preventing the base station from incorrectly determining a current state of the UE.

Figure 3:
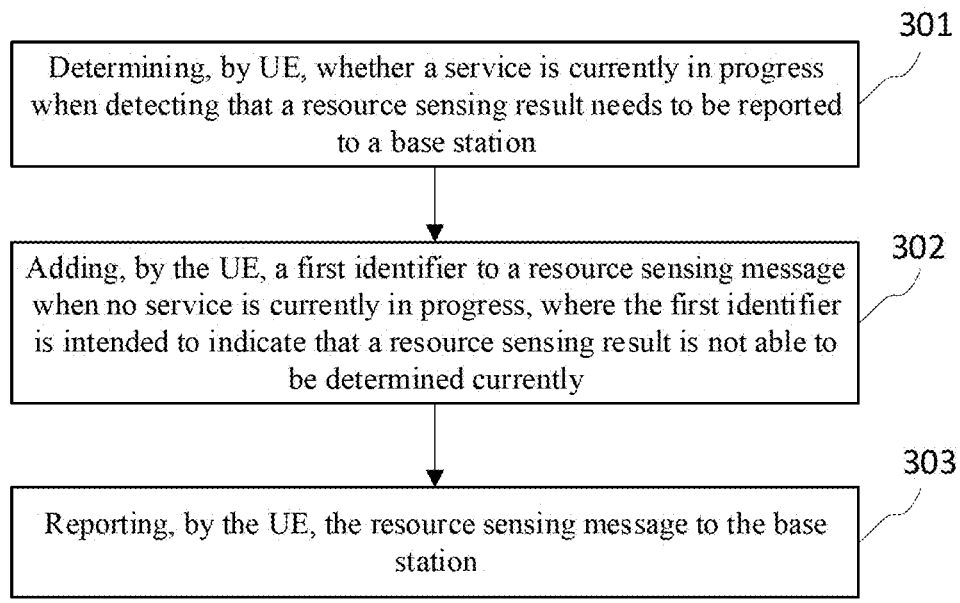
FIG. 3 is a flowchart of a method for reporting a resource sensing result according to another exemplary embodiment.

FIG. 3 is a flowchart of a method for reporting a resource sensing result according to an exemplary embodiment. In this embodiment of the present disclosure, a fact that a resource sensing message includes a specified identifier and the specified identifier is a first identifier is taken as an example for description. As shown in FIG. 3, the method for reporting the resource sensing result includes the following steps.

In step 301, UE determines whether a service is currently in progress in response to detecting that a resource sensing result needs to be reported to a base station. In a possible implementation, when the UE is set to a mechanism of periodically reporting a resource sensing result and a current moment is a reporting moment in a current period, the UE periodically reports an instruction trigger. Each time when the instruction trigger is detected, the UE determines that it is detected that the resource sensing result needs to be reported to the base station.

Before this step, the base station configures that the UE periodically reports a resource sensing result. A process of the configuration includes: transmitting, by the base station, a configuration instruction to the UE; and receiving, by the UE, the configuration instruction from the base station, and configuring, based on the configuration instruction, a reporting mechanism of periodically reporting a resource sensing result.

In another possible implementation, the UE non-periodically reports a resource sensing result, the base station transmits a reporting instruction of reporting the resource sensing result to the UE, and when the UE receives the reporting instruction, the UE determines that it is detected that the resource sensing result needs to be reported to the base station.

Before the UE reports the resource sensing result to the base station, the UE determines, based on a current state of the UE, whether the service is currently in progress, and if no service is currently in progress, performs step 302. When the service is currently in progress, the UE determines an actual sensing start time and an actual sensing end time based on a start time and an end time of the current service, determines a third resource sensing result based on the actual sensing start time and the actual sensing end time, and adds a third sensing result to a resource sensing message, and performs step 303.

After determining the third sensing result, the UE stores the third sensing result, such that when it is detected subsequently that the resource sensing result needs to be reported to the base station, the resource sensing result acquired before the current moment may be reported.

In step 302, the UE adds a first identifier to a resource sensing message in response to determining that no service is currently in progress, where the first identifier is intended to indicate that the resource sensing result is not able to be determined currently. After the UE detects that the resource sensing result needs to be reported, if a service is currently in progress, the UE transmits the resource sensing message to the base station, where the first identifier rather than the resource sensing result is added to the resource sensing message, and the first identifier is intended to indicate that a resource sensing result is not able to be determined currently.

The first identifier is carried in a first field in the resource sensing message, and the value of the first field indicates whether the resource sensing message carries the first identifier. For example, the value "0" of the first field is intended to indicate that the resource sensing message does not carry the first identifier. The value "1" of the first field is intended to indicate that the resource sensing message carries the first identifier.

In step 303, the UE reports the resource sensing message to the base station. The base station receives the resource sensing message reported by the UE, parses the first identifier from the resource sensing message, and determines, based on the first identifier, that the UE is not able to determine the resource sensing result currently, to further determine that the UE is still under the control of the base station.

According to the embodiments of the present disclosure, a first identifier, indicating that a resource sensing result is not able to be determined currently, is added to a resource sensing message, such that the UE can report the resource sensing message, and the base station can receive the resource sensing result reported by the UE, thereby preventing the base station from incorrectly determining a current state of the UE.

Figure 4:
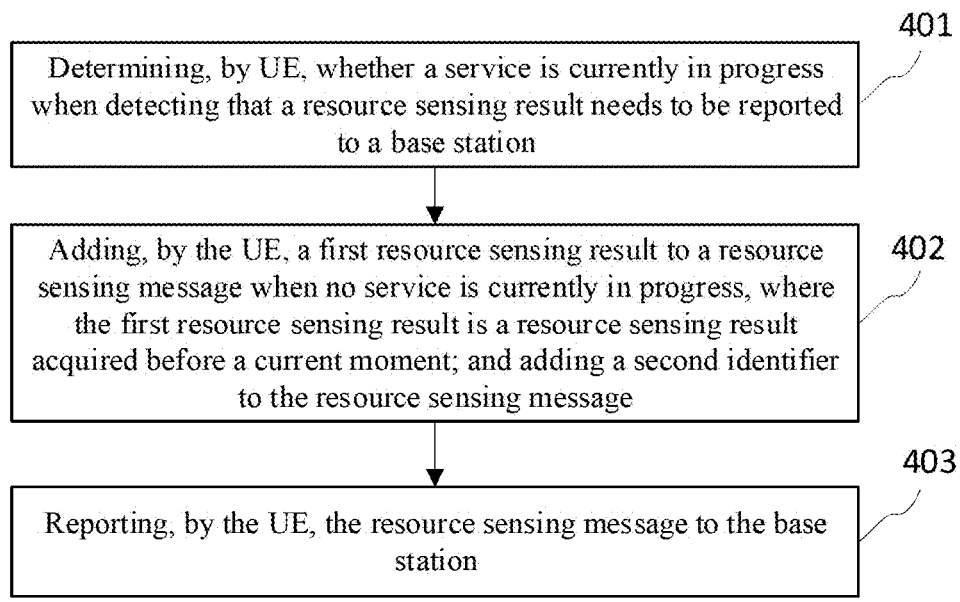
FIG. 4 is a flowchart of a method for reporting a resource sensing result according to still another exemplary embodiment.

FIG. 4 is a flowchart of a method for reporting a resource sensing result according to still another exemplary embodiment. In this embodiment, a fact that a resource sensing message includes a first resource sensing result and a specified identifier, and the specified identifier is a second identifier is taken as an example for description. As shown in FIG. 4, the method for reporting a resource sensing result includes the following steps.

In step 401, UE determines whether a service is currently in progress in response to detecting that a resource sensing result needs to be reported to a base station. This step is the same as step 301. Details are not described herein again.

In step 402, the UE adds a first resource sensing result to a resource sensing message in response to determining that no service is currently in progress, where the first resource sensing result is a resource sensing result acquired before a current moment, and adds a second identifier to the resource sensing message.

Step 402 is implemented by the following steps (1) to (3), including the following steps.

(1): When no service is currently in progress, the UE acquires the first resource sensing result acquired before the current moment. The first resource sensing result may be all resource sensing results in one resource sensing result acquired before the current moment or may be some resource sensing results in one resource sensing result acquired before the current moment. When the first resource sensing result is some resource sensing results in one resource sensing result acquired before the current moment, the first resource sensing result may be resource sensing results after the current moment in one resource sensing result acquired before the current moment.

When the first resource sensing result is all resource sensing results in one resource sensing result acquired before the current moment, in a possible implementation, when a service needs to be executed, the UE determines a resource sensing result, and stores a correspondence between a sensing time and the resource sensing result. Correspondingly, in this step, when it is determined that a service is currently in progress, based on the current moment, a resource sensing result acquired before the current moment is acquired from the stored correspondence between the sensing time and the resource sensing result, and the resource sensing result, as the first resource sensing result, is added to the resource sensing message.

In another possible implementation, the UE may also only store a resource sensing result acquired before the current moment. In this step, the stored resource sensing result acquired before the current moment is directly acquired, and the resource sensing result is added to the resource sensing message as the first resource sensing result. A sensing start time of the first resource sensing result is earlier than the current moment, and a sensing end time of the first resource sensing result is later than the current moment.

When the first resource sensing result is some resource sensing results in one resource sensing result acquired before the current moment, the UE acquires a fourth resource sensing result acquired before the current moment, acquires resource sensing results after the current moment in the fourth resource sensing result, and adds resource sensing results after the current moment in the fourth resource sensing result to the resource sensing message as the first resource sensing result. The sensing start time of the fourth resource sensing result is earlier than the current moment, and the sensing end time of the fourth resource sensing result is later than the current moment. The sensing start time of the first resource sensing result is the current moment, and the sensing end time of the first resource sensing result is later than the current moment.

(2): The UE adds the first resource sensing result to the resource sensing message.

(3): The UE adds the second identifier to the resource sensing message, where the second identifier is intended to indicate that the first resource sensing result is acquired before the current moment. The second identifier may be a second field carried in the resource sensing message. The second field is different from the first field, and the value of the second field identifies whether the resource sensing message carries the second identifier. For example, the value "1" of the second field is intended to indicate that the resource sensing message carries the second identifier. The value "0" of the second field is intended to indicate that the resource sensing message does not carry the second identifier.

The second identifier may be alternatively a time difference between the current moment and a sensing moment of the first resource sensing result. When the second field is the time difference, the value of the second field is directly set as the time difference. The sensing moment is the sensing start time of the first resource sensing result.

In a possible implementation, the second identifier may indicate that the first resource sensing result is acquired before the current moment. For example, the UE performs resource sensing at a moment $T_1$ and determines the resource sensing result within a time period from $T_2$ to $T_3$, it is detected at a moment $T_4$ that the first resource sensing result needs to be reported to the base station, and no service is currently in progress at the moment $T_4$, that is, resource sensing cannot be performed. When $T_2 < T_4 < T_3$, the UE may report the first resource sensing result in a time period from $T_4$ to $T_3$, and indicate that the resource sensing result is acquired before the current moment by the second identifier.

In another possible implementation, the second identifier may indicate the time difference between a second resource sensing result and the current moment. For example, the UE performs resource sensing at a moment $T_1$, the resource sensing result within a time period from $T_2$ to $T_3$ is determined, it is detected at a moment $T_4$ that a resource sensing result needs to be reported to the base station, no service is currently in progress at the moment $T_4$, that is, resource sensing cannot be performed. When $T_2 < T_4 < T_3$, the UE may report the resource sensing result within a time period from $T_4$ to $T_3$, and indicates that the time difference between the resource sensing result and the current moment is $T_4 - T_2$ by the second identifier.

It further needs to be noted that the second identifier may further indicate that the second resource sensing result is a resource sensing result within a time period $T_4 - T_3$. It further needs to be noted that, the order of adding the first resource sensing result and the second identifier to the resource sensing message is not fixed. The first resource sensing result may be added first, and the second identifier is then added. Alternatively, the second identifier may be added first, and the first resource sensing result is then added. That is, steps (1) and (2) may be performed before step (3) is performed. Alternatively, step (3) may be performed before steps (1) and (2) are performed.

In step 403, the UE reports the resource sensing message to the base station. This step is the same as step 303. Details are not described herein again.

According to the embodiments of the present disclosure, a first resource sensing result previously obtained is added to a resource sensing message, and a second identifier is used to indicate that the first resource sensing result is a previously obtained, such that the UE can report the resource sensing message, and the base station can receive the resource sensing result reported by the UE, thereby preventing the base station from incorrectly determining a current state of the UE.

Figure 5:
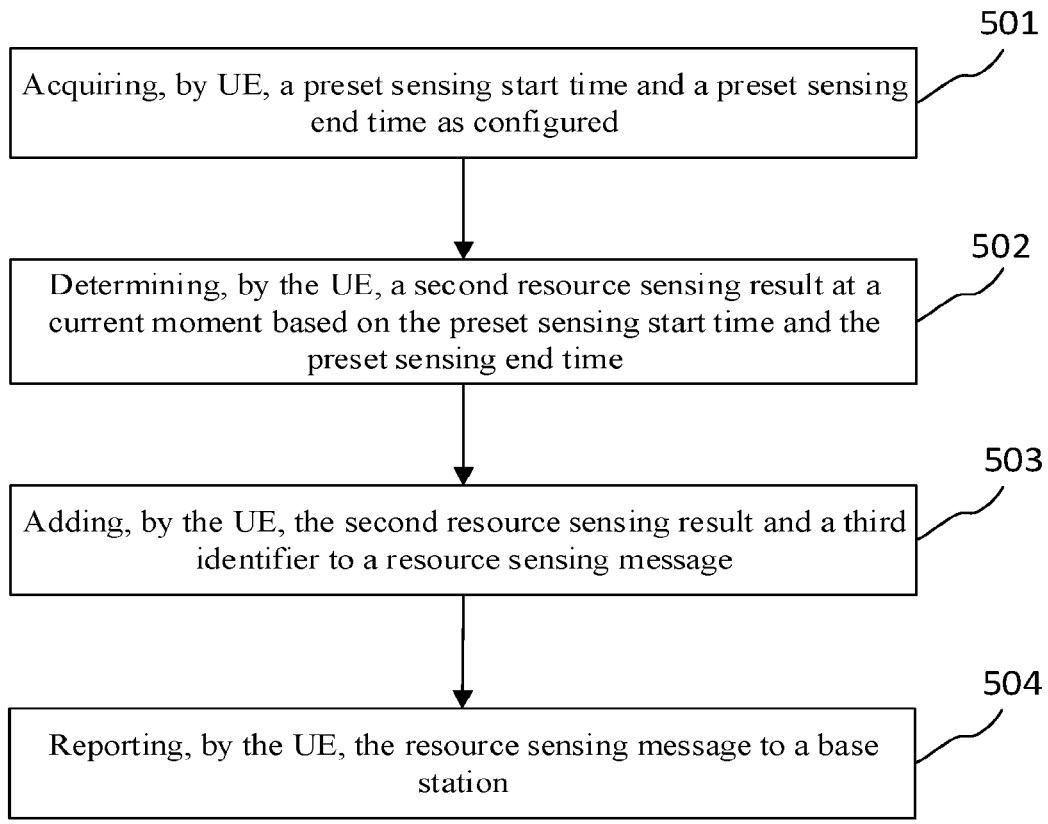
FIG. 5 is a flowchart of a method for reporting a resource sensing result according to yet another exemplary embodiment.

FIG. 5 is a flowchart of a method for reporting a resource sensing result according to yet another exemplary embodiment. In this embodiment, a fact that a base station configures a preset sensing start time and a preset sensing end time for resource sensing, and if a service is currently in progress, UE determines a second resource sensing result based on the preset sensing start time and the preset sensing end time, and adds the second resource sensing result and a third identifier to a resource sensing message is taken as an example for description. As shown in FIG. 5, the method for reporting a resource sensing result may include the following steps.

In step 501, the UE acquires a preset sensing start time and a preset sensing end time. In a first implementation, the UE receives a first reconfiguration message from a base station, the first reconfiguration message includes the preset sensing start time and the preset sensing end time; and the UE acquires the preset sensing start time and the preset sensing end time from the first reconfiguration message. The preset sensing start time may be the current moment or may be any moment after the current moment, and the preset sensing end time is any moment after the current moment.

It needs to be noted that the first reconfiguration message from the base station may be separately from the base station to the UE in advance. The first reconfiguration message from the base station may be alternatively carried in a reporting instruction of reporting the resource sensing result from the base station to the UE.

When the first reconfiguration message is carried in the reporting instruction of reporting the resource sensing result from the base station to the UE, the first reconfiguration message is performing resource sensing for a time duration after the detection moment. Alternatively, the first reconfiguration message may be two specific moments. For example, the base station may transmit the reporting instruction of reporting the resource sensing result to the UE at a moment $T_8$, where in the reporting instruction, it is specified that the moment $T_9$ is the preset sensing start time, and it is specified that the moment $T_{10}$ is the preset sensing end time, and resource sensing is performed based on the preset sensing start time $T_9$ and the preset sensing end time $T_{10}$.

In a second implementation, the UE determines the preset sensing start time and preset sensing end time based on the current moment and a preset time interval. The UE may determine the current moment as the preset sensing start time, and determine a moment later than the current moment by the preset time interval as the preset sensing end time. The preset time interval includes a first time interval and a second time interval. The UE may determine a moment later than the current moment by the first time interval as the preset sensing start time, and determine a moment later than the preset sensing start time by the second time interval as the preset sensing end time.

The preset time interval is any time interval negotiated by the base station and the UE. For example, in this step or before this step, the base station may transmit a second reconfiguration message to the UE. The second reconfiguration message includes the preset time interval. Similarly, the second reconfiguration message from the base station is separately from the base station to the UE in advance. Alternatively, the second reconfiguration message from the base station is carried in the reporting instruction of reporting the resource sensing result from the base station to the UE.

When the second reconfiguration message is from the base station to the UE in advance, the UE receives the second reconfiguration message from the base station. The second reconfiguration message is performing, when it is detected that the resource sensing result needs to be reported to the base station, resource sensing within a time duration after the moment at which it is detected that the resource sensing result needs to be reported to the base station. For example, the moment at which the UE detects that the resource sensing result needs to be reported to the base station is $T_5$, the first time interval configured in the second reconfiguration message is 10 s, the second time interval is also 10 s, that is, the preset sensing start time is $T_6=T_5+10$ s and the sensing duration is 10 s, such that the preset sensing end time is $T_7=T_6+10$ s Resource sensing is performed based on the preset sensing start time $T_6$ and the preset sensing end time $T_7$.

In step 502, the UE determines a second resource sensing result at a current moment based on the preset sensing start time and the preset sensing end time.

In step 503, the UE adds the second resource sensing result and a third identifier to a resource sensing message. The second resource sensing result and the third identifier are added to the resource sensing message. The third identifier is intended to indicate that the second resource sensing result is determined based on the preset sensing start time and preset sensing end time.

The third identifier may be carried in a third field in the resource sensing message. The third field is different from neither the first field nor the second field, and the value of the third field identifies whether the resource sensing message carries the third identifier. For example, the value "1" of the third field is intended to indicate that the resource sensing message carries the third identifier. The value "0" of the third field is intended to indicate that the resource sensing message does not carry the third identifier.

In step 504, the UE reports the resource sensing message to a base station. This step is the same as step 303. Details are not described herein again.

According to embodiments of the present disclosure, a preset sensing start time and a preset sensing end time are configured, such that when it is detected that a resource sensing result needs to be reported to a base station and no service is currently in progress, the UE performs resource sensing based on the preset sensing start time and the preset sensing end time, and adds a second resource sensing result to a resource sensing message; a third identifier indicates that the resource sensing result is obtained by using the preset sensing start time and the preset sensing end time, to enable the base station to receive the resource sensing result reported by the UE, thereby preventing the base station from incorrectly determining a current state of the UE.

Figure 6:
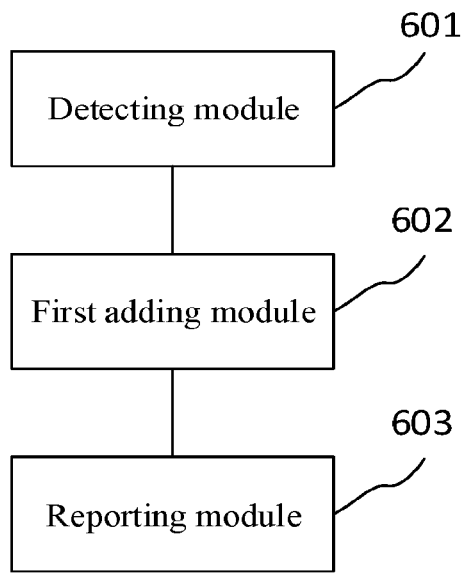
FIG. 6 is a block diagram of an apparatus for reporting a resource sensing result according to an exemplary embodiment.

FIG. 6 is a block diagram of an apparatus for reporting a resource sensing result according to an exemplary embodiment. The apparatus is configured to perform the steps performed by UE in the foregoing method for reporting a resource sensing result. Referring to FIG. 6, the apparatus includes a detecting module 601 that is configured to: determine whether a service is currently in progress in response to detecting that a resource sensing result needs to be reported to a base station, a first adding module 602 that is configured to: add a specified identifier to a resource sensing message in response to determining that no service is currently in progress, where the specified identifier is intended to indicate that no service is currently in progress, and a reporting module 603 that is configured to report the resource sensing message to the base station.

In a possible implementation, the specified identifier is a first identifier, and the first identifier is intended to indicate that the resource sensing result is not able to be determined currently.

In a possible implementation, the apparatus can further include a second adding module that can be configured to add a first resource sensing result to the resource sensing message, where the first resource sensing result is a resource sensing result acquired before a current moment, and correspondingly, the specified identifier is a second identifier intended to indicate that the resource sensing result is acquired before the current moment. In a possible implementation, the second identifier is a time difference between the current moment and a sensing moment of the first resource sensing result.

In a possible implementation, the apparatus can further include an acquiring module that is configured to acquire a preset sensing start time and a preset sensing end time, a first determining module that is configured to determine a second resource sensing result at a current moment based on the preset sensing start time and the preset sensing end time, and a second adding module, that is further configured to add the second resource sensing result to the resource sensing message.

In a possible implementation, the specified identifier is a third identifier, and the third identifier is intended to indicate that the second resource sensing result is determined based on the preset sensing start time and preset sensing end time.

In a possible implementation, the acquiring module is further configured to: receive a reconfiguration message from the base station, where the reconfiguration message includes the preset sensing start time and the preset sensing end time, or determine the preset sensing start time and preset sensing end time based on the current moment and a preset time interval.

In a possible implementation, the apparatus further includes a second determining module that is configured to determine that it is detected that the resource sensing result needs to be reported in response to a reporting mechanism being to periodically report the resource sensing result and a current moment being a reporting moment in a current period, or determine that it is detected that the resource sensing result needs to be reported in response to a reporting mechanism being to non-periodically report the resource sensing result and a reporting instruction from the base station being received.

In a possible implementation, the apparatus further includes a third determining module that can be configured to determine an actual sensing start time and an actual sensing end time based on a start time and an end time of the current service in response to determining that the service is current in progress, a fourth determining module that is configured to determine a third resource sensing result based on the actual sensing start time and the actual sensing end time, and a third adding module that is configured to add a third sensing result to the resource sensing message.

It should to be noted that when the apparatus for reporting the resource sensing result provided in the foregoing embodiments reports a resource sensing result, the division of the foregoing functional modules is only an example for description. During actual application, the foregoing functions may be allocated to different functional modules as required. That is, the internal structure of the apparatus is divided into different functional modules, to complete all or some functions described above. In addition, the apparatus for reporting the resource sensing result provided in the foregoing embodiments and the embodiments of the method for reporting the resource sensing result belong to the same concept. For a specific implementation process of the apparatus, reference may be made to the method embodiments. Details are not described herein again.

Figure 7:
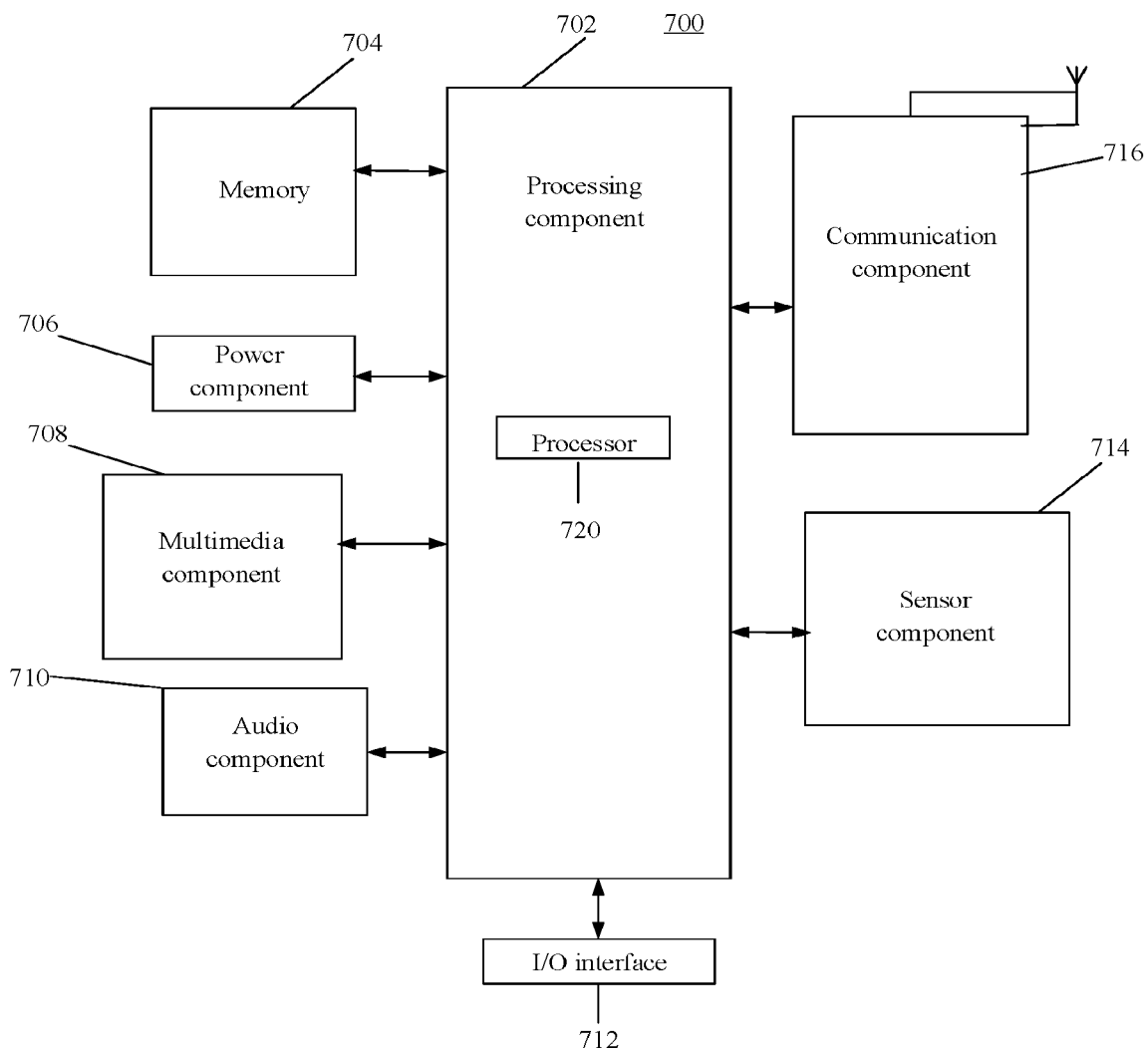
FIG. 7 is a block diagram of UE according to an exemplary embodiment.

FIG. 7 is a block diagram of UE 700 according to an exemplary embodiment. For example, the UE 700 may be a mobile phone, a computer, a digital broadcast UE, a message transceiver device, a game console, a tablet device, a medical equipment, a fitness equipment, a personal digital assistant, or the like.

Referring to FIG. 7, the UE 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the UE 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the UE 700. Examples of such data include instructions for any applications or methods operated on the UE 700, contact data, phonebook data, messages, pictures, video, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 706 provides power to various components of the UE 700. The power component 706 may include a power management system, one or more power sources, and any other components associated with the generation, management, and distribution of power in the UE 700.

The multimedia component 708 includes a screen providing an output interface between the UE 700 and a user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes, and gestures on the TP. The touch sensors may not only sense a boundary of a touch or swipe action, but also sense the time duration and a pressure associated with the touch or swipe action. In some embodiments, the multimedia component 708 includes a front camera and/or a rear camera. The front camera and/or the rear camera may receive external multimedia data while the UE 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive external audio signals when the UE 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide state assessments of various aspects of the UE 700. For instance, the sensor component 714 may detect an open/closed state of the UE 700, relative positioning of components, for example, the display device and the mini-keypad, of the UE 700, a change in position of the UE 700 or a component of the UE 700, a presence or absence of user in contact with the UE 700, an orientation or an acceleration/deceleration of the UE 700, and a change in temperature of the UE 700. The sensor component 714 may include a proximity sensor configured to detect the presence of nearby objects without any physical contact. The sensor component 714 may also include a light sensor, such as a CMOS or CCD image sensor, used for imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the UE 700 and other devices. The UE 700 can access any wireless network based on a communication standard such as Wi-Fi, 2G, 3G or a combination thereof. In one exemplary embodiment, the communication component 716 receives a broadcast signal or broadcast associated messages from an external broadcast management system via a broadcast channel. In one exemplary embodiment, the communication component 716 further includes a near field communication (NFC) module to facilitate short-range communications.

In exemplary embodiments, the UE 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the foregoing method for reporting a resource sensing result.

In exemplary embodiments, a non-transitory computer-readable storage medium storing instructions therein is further provided, for example, the memory 704 including instructions. The foregoing instructions, when executed by the processor 720 of the UE 700, cause the processor to perform the foregoing method. For example, the non-transitory computer-readable storage medium may be a ROM, a random access memory (RAM), a CD-ROM, a magnetic tape, a floppy disk, an optical data storage device, and the like.

An embodiment of the present disclosure further provides a computer-readable storage medium. The computer-readable storage medium is applicable to UE. The computer-readable storage medium stores at least one instruction, at least one program, a code set, or an instruction set. The instruction, the program, the code set, or the instruction set, when loaded and executed by a processor, cause the processor to perform the operations of the UE in the method for reporting a resource sensing result in the foregoing embodiments.

Other embodiments of the present disclosure may be easily conceived by those skilled in the art after taking the description into consideration and practicing the solution disclosed herein. The present disclosure is intended to cover any variations, uses, or adaptive changes of the present disclosure. These variations, uses, or adaptive changes follow the general principles of the present disclosure and include common general knowledge or conventional technical means in the art that are not disclosed herein. The description and the embodiments are to be regarded as being exemplary only. The true scope and spirit of the present disclosure are subject to the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reporting a resource sensing result, being capable to user equipment (UE), wherein sidelink resources corresponding to the UE are determined by autonomous selection of the UE as well as by dynamic scheduling of a base station; and the method comprises:
   determining that a sidelink resource sensing result is detected and needs to be reported to the base station in a case of a reporting mechanism periodically reporting the sidelink resource sensing result and a current moment being a reporting moment in a current period, or determining that a sidelink resource sensing result is detected and needs to be reported to the base station in a case of a reporting mechanism non-periodically reporting the sidelink resource sensing result and a reporting instruction from the base station being received;
   in a case that no service is currently in progress, adding a first resource sensing result and a second identifier to a resource sensing message, wherein the first resource sensing result is a sidelink resource sensing result obtained before the current moment, and the second identifier indicates that the first resource sensing result is the sidelink resource sensing result obtained before the current moment; or adding a second resource sensing result and a third identifier to a resource sensing message, wherein the second resource sensing result is a sidelink resource sensing result determined based on a preset sensing start time and a preset sensing end time, and the third identifier indicates that the second resource sensing result is the sidelink resource sensing result determined based on the preset sensing start time and the preset sensing end time; and
   reporting the resource sensing message to the base station, wherein the resource sensing message is configured for the base station to schedule the sidelink resources for the UE.

2. The method according to claim 1, wherein the second identifier is a time difference between the current moment and a sensing moment of the first resource sensing result.

3. The method according to claim 1, wherein the method further comprises:
   acquiring the preset sensing start time and the preset sensing end time;
   determining a second resource sensing result at a current moment based on the preset sensing start time and the preset sensing end time; and
   adding the second resource sensing result to the resource sensing message.

4. The method according to claim 3, wherein acquiring the preset sensing start time and the preset sensing end time comprises one of:
   receiving a reconfiguration message from the base station, the reconfiguration message including the preset sensing start time and the preset sensing end time; and
   determining the preset sensing start time and preset sensing end time based on the current moment and a preset time interval.

5. The method according to claim 1, further comprising:
   determining an actual sensing start time and an actual sensing end time based on a start time and an end time of the current service in the case that the service is currently in progress;

determining the third resource sensing result based on the actual sensing start time and the actual sensing end time; and adding the third resource sensing result to the resource sensing message.

6. A non-transitory computer-readable storage medium that stores instructions that, when executed by a processor, cause the processor to perform the method for reporting a resource sensing result as recited in claim 1.

7. The method according to claim 1, wherein the UE stores a correspondence between sensing time and resource sensing results; the first resource sensing result is acquired from the correspondence between sensing time and resource sensing results based on the current moment, and the first resource sensing result is added to the resource sensing message.

8. The method according to claim 1, wherein the UE stores a resource sensing result acquired before the current moment; and the resource sensing result acquired before the current moment is directly acquired and regarded as the first resource sensing result, and the first resource sensing result is added to the resource sensing message, a sensing start time of the first resource sensing result being earlier than the current moment, and a sensing end time of the first resource sensing result being later than the current moment.

9. A user equipment (UE), wherein sidelink resources corresponding to the UE are determined by autonomous selection of the UE as well as by dynamic scheduling of a base station; and the UE comprises:
  a processor; and
  a memory that is configured to store instructions executable by the processor,
  wherein the processor, when executing the instructions, is caused to perform a method for reporting a resource sensing result comprising:
  determining that a sidelink resource sensing result is detected and needs to be reported to the base station in a case of a reporting mechanism periodically reporting the sidelink resource sensing result and a current moment being a reporting moment in a current period; or determining that a sidelink resource sensing result is detected and needs to be reported to the base station in a case of a reporting mechanism non-periodically reporting the sidelink resource sensing result and a reporting instruction from the base station being received;
  in a case that no service is currently in progress, adding a first resource sensing result and a second identifier to a resource sensing message, wherein the first resource sensing result is a sidelink resource sensing result obtained before the current moment, and the second identifier indicates that the first resource sensing result is the sidelink resource sensing result obtained before the current moment; or adding a second resource sensing result and a third identifier to a resource sensing message, wherein the second resource sensing result is a sidelink resource sensing result determined based on a preset sensing start time and a preset sensing end time, and the third identifier indicates that the second resource sensing result is the sidelink resource sensing result determined based on the preset sensing start time and the preset sensing end time; and
  reporting the resource sensing message to the base station, wherein the resource sensing message is configured for the base station to schedule the sidelink resources for the UE.

10. The UE according to claim 9, wherein the second identifier is a time difference between the current moment and a sensing moment of the first resource sensing result.

11. The UE according to claim 9, wherein the method further comprises:
  acquiring the preset sensing start time and the preset sensing end time;
  determining a second resource sensing result at a current moment based on the preset sensing start time and the preset sensing end time; and
  adding the second resource sensing result to the resource sensing message.

12. The UE according to claim 11, wherein acquiring the preset sensing start time and the preset sensing end time comprises one of:
  receiving a reconfiguration message from the base station, the reconfiguration message includes the preset sensing start time and the preset sensing end time; or
  determining the preset sensing start time and preset sensing end time based on the current moment and a preset time interval.

13. The UE according to claim 9, the method further comprises:
  determining an actual sensing start time and an actual sensing end time based on a start time and an end time of the current service in the case that the service is currently in progress;
  determining the third resource sensing result based on the actual sensing start time and the actual sensing end time; and
  adding the third resource sensing result to the resource sensing message.

14. The UE according to claim 9, wherein the UE stores a correspondence between sensing time and resource sensing results; the first resource sensing result is acquired from the correspondence between sensing time and resource sensing results based on the current moment, and the first resource sensing result is added to the resource sensing message.

15. The UE according to claim 9, wherein the UE stores a resource sensing result acquired before the current moment; and the resource sensing result acquired before the current moment is directly acquired and regarded as the first resource sensing result, and the first resource sensing result is added to the resource sensing message, a sensing start time of the first resource sensing result being earlier than the current moment, and a sensing end time of the first resource sensing result being later than the current moment.

* * * * *